United States Patent [19]

Ko et al.

[11] Patent Number: 4,546,035

[45] Date of Patent: Oct. 8, 1985

[54] POLYMERIC ADDITIVES FOR MAGNETIC COATING MATERIALS

[75] Inventors: Ming Ko; Michael E. Oxsen; Robert B. Prime, all of San Jose, Calif.

[73] Assignee: International Business Machines Corporation, Armonk, N.Y.

[21] Appl. No.: 508,300

[22] Filed: Jun. 27, 1983

[51] Int. Cl.[4] ................................................ G11B 5/72
[52] U.S. Cl. ............................... 428/315.9; 252/62.54; 360/134; 360/135; 360/136; 427/128; 428/315.5; 428/425.9; 428/521; 428/522; 428/694; 428/695; 428/900; 428/317.9
[58] Field of Search ............ 428/694, 695, 900, 425.9, 428/315.5, 317.9, 315.9, 521, 522; 252/62.54; 360/134–136; 427/128

[56] References Cited

U.S. PATENT DOCUMENTS

| | | | |
|---|---|---|---|
| 4,032,682 | 6/1977 | Masson | 427/130 |
| 4,163,823 | 8/1979 | Legras | 427/132 |
| 4,267,238 | 5/1981 | Cherneqa | 428/900 |
| 4,268,556 | 5/1981 | Pedrotty | 428/695 |
| 4,368,239 | 1/1983 | Nakajima | 428/695 |
| 4,390,601 | 6/1983 | Orio | 428/695 |
| 4,396,674 | 8/1983 | Somezaura | 428/900 |
| 4,405,684 | 9/1983 | Blumentritt | 428/336 |
| 4,407,853 | 10/1983 | Okita | 427/130 |
| 4,450,199 | 5/1984 | Tadokoro | 428/694 |

*Primary Examiner*—Ellis P. Robinson
*Attorney, Agent, or Firm*—Joseph G. Walsh

[57] ABSTRACT

A heat curable magnetic coating mixture contains one or more polymeric additives selected to thermally oxidize during coating cure to create a plurality of microvoids in the cured coating as an aid to increase the retention of a lubricant which is applied to the cured coating.

3 Claims, No Drawings

POLYMERIC ADDITIVES FOR MAGNETIC COATING MATERIALS

BACKGROUND OF THE INVENTION

Field of Invention

This invention is directed to magnetic recording compositions having selected additives therein which help to increase the durability of the magnetic recording layer and the retention of a lubricant material which is applied to the surface of the magnetic recording composition.

Description of Prior Art

A magnetic recording medium, such as a magnetic disk, includes a thermosetting or thermoplastic organic binder system and magnetic particles such as iron oxide. The organic polymer matrix containing the magnetic particles is applied to the disk in solvents at a given thickness and cured to a tough durable film. As a function of disk file operation at constant rotational speed with a magnetic recording head flying over the disk surface at a given height, there occur instances of head-disk interaction which have the potential of degrading the recording medium and shortening the life of the disk file.

The use of a fluorocarbon lubricant, such as shown in U.S. Pat. No. 4,267,238 and U.S. Pat. No. 4,268,556, has been found to protect the disk medium from damage during head disk interactions. The introduction of lubricant to the disk surface, and the long term retention of the lubricant, is of primary importance to the continued operation of current and future disk files. In addition, it is found that as a function of different batches of organic polymer magnetic coating formulations, the relative retention of fluorocarbon lubricant varies in an uncontrollable manner.

It has been found that the lubricant retention of a particulate disk coating formulation can be attributed to two separate processes; retention of lubricant within microroughnesses near the surface of a disk, and retention of lubricant in microvoids distributed throughout some thickness of the coating. It is further suggested that the retention of lubricant attributed to the surface process is fairly constant as a function of different disk coating formulations, while that attributed to the microvoid process varies from coating batch to coating batch. Further, it has been found that this variance of lubricant retention as a function of microvoid density occurs as a result of different levels of phase separation of an organic constituent of the coating plus different levels of oxidative degradation volatilization during cure. The development of a thermal analytical technique which correlates different levels of phase separation and Oxidative Weight Loss (OWL) to the observed variance of lubricant retention between coating batches is the basis of this understanding. The analytical techniques used for this correlation can by Dynamic Mechanical Analysis (DMA) and Thermal Gravimetric Analysis (TGA).

SUMMARY OF THE INVENTION

The present invention is directed to the use in a magnetic coating composition of polymeric additives, which due to their ability to phase separate and their inherently lower thermal oxidative stability in relation to the magnetic coating binder system, result in additional microvoid formation from the same process as-cribed to the current thermal oxidative degradation volatilization mechanism. In addition to their utility in microvoid formation, these polymer additives produce increased durability of the magnetic coating if they are selected so as not to be 100% thermally oxidized during coating cure.

DESCRIPTION OF THE PREFERRED EMBODIMENT

The present invention involves the selection of a proper polymeric additive or combination of additives to achieve the optimum improvement in both lubricant retention and coating durability. At one end, if the polymeric additive or additives are selected so as to be 100% thermally oxidizable during coating cure, this will result in a maximum increase in microvoid formation to enhance lubricant retention, but it will have little or no effect on increased coating durability from the presence of the polymeric additive since all of the additive has oxidized from the coating. On the other hand, if the polymeric additive or additives are selected so as to undergo substantially no thermal oxidation during coating cure, this will have a maximum effect on improved coating durability because of the lubricating qualities of the additive or additives, but will have little or no effect on microvoid formation for increased lubricant retention.

Examples of polymeric additives which are useful in practicing the present invention are the following, either alone or in combination:

Polybutene
Acrylonitrite-methyl methacrylate copolymers
Maleic anhydride-methyl methacrylate copolymers
Poly(ethylene oxide)
Polyformaldehyde
Poly($\gamma$-methylstyrene)
Poly(styrene-b-methyl methacrylate)
Poly(methyl methacrylate)
Polysulfones
Poly(vinyl acetate)
Low molecular weight polyethylene, polypropylene The use of polymer additives in accordance with the present invention, results in the following advantages:

1. The separation of desired film durability mechanical properties from the mechanism of microvoid formation which results in the desired lubricant retention for extended disk file operation. Separation of these two factors allows the design of disk recording media with increased abrasion resistance and lubricant retention.

2. Control of lubricant retention variability, thereby increasing disk manufacturing throughput, and head-disk assembly (HDA) reliability, with a potentially large cost savings due to increased yield from the manufacturing line.

3. Control of the size, distribution, and content of microvoids throughout the bulk of the coating by the selection of polymeric additives which, due to their different thermal oxidative stability, would result in different rates and degrees of volatilization. It has the potential of controlling the rate at which the microvoid lubricant retention fraction migrates to the head disk interface, thereby giving control of disk file life.

4. Allow the retention of lubricant by the same mechanism of microvoid density for many binder formulations, which due to their higher thermal oxidative stability, are inherently deficient in microvoid content.

The unique properties of the current invention stem from the use of polymeric additives which thermally degrade during coating cure, volatilizing with nearly 100% efficiency if desired. This is in contrast to other polymeric additives, such as polyvinylmethylether (PVME), which is also subject to thermal oxidative degradation, but which has much lower volatilization efficiency. These differences are due to either the presence of crosslinkable pendant side chain functionality, or higher molecular weight characteristics, as in the case of PVME.

The polymeric additives of the current invention can be used in a suitable concentration, the range preferably being from 0.5 to 5% by weight of the magnetic pigment particles. The additives may be added at a suitable stage of the coating preparation process, i.e., after ball milling, post dispersion, or filtering. A matrix study designed to assay the effect of polymeric additives showed an increase in lubricant retention and abrasion resistance over a control formulation without additive. Subsequent TGA of a coating batch with and without one or more polymeric additives correlated the observed increase in thermal oxidative volatilization due to the additive to the previously observed increase in lubricant retention.

Under certain conditions, the poly(butene) material totally degrades and volitalizes as a function of isothermal temperature. Variations on this theme can be developed by utilizing different molecular weight fractions of poly(butene) giving different rates of degradation and weight loss from 0 to 100%, depending on the desired application.

As a consequence of the inherently greater sensitivity to thermal oxidative reactions, these materials act as sacrificial polymeric components which scavenge available oxygen from the coatings.

Table 1 below lists the results of lubricant retention evaluations conducted on samples of magnetic recording disks having a polyurethane coating with magnetic particles dispersed therein as described, for example, in copending application Ser. No. 304,445, filed Sept. 21, 1981 (R09-80-008). The first batch of tested disks listed in column 1 contained no polymeric additive. The disks in column 2 contained polybutene in an amount equal to 5% by weight of the magnetic iron oxide in the dispersion. The polybutene was in the form of a compound identified as H-35 manufactured by Amoco Chemical Co. Those disks listed in column 3 contained polymeric polyethylene beads manufactured under the name of XF Mekon by Western Petro Chemical.

TABLE 1

|  | 1 | 2 | 3 |
|---|---|---|---|
| Polyurethane coating (parts by weight) | 600 | 600 | 600 |
| Iron oxide (parts by weight) | 287 | 287 | 287 |
| Lubricant additive (5% of Magnetic Pigment by weight) | 0 | polybutene | polyethylene beads |
| Lubricant retention mg/14" disk surface | 4.9 | 9.9 | 8.9 |
| Lubricant retention increase | — | +102% | +82% |

It can be seen from Table 1 that the use of polybutene in the coating composition results in a major increase in the amount of lubricant retained in the disk, and that the use of the polyethylene beads produced a significant increase in lubricant retention.

Table 2 below lists a number of properties of magnetic disks formulated using a polymeric additive in accordance with the present invention as compared with disks not having such an additive (control formulation). The magnetic coating formulation for the disks in Table 2 was an epoxy/phenolic system and the polymeric additive was H-35.

The coefficient of friction and film toughness were measured with a slightly modified standard ASTM pin-on-disk shear tester. A measure of the efficiency of these solid lubricants was performed with a shear tester with a shear force of 20 grams applied to the disk surface through reciprocating stainless steel balls of ⅛ in. diameter. The reciprocal force applied to the disk provides the measurement of coefficient of friction and number of cycles to deplete the coating surface and eventually tear up the coating to the bare substrate. When these disks were coated with an extra layer of lubricant on the surface, they all performed the same; the coefficients of friction were between 0.11 and 0.12, and film toughness was excellent. After delubricating these disks with proper solvents, the lubricant retention showed an increase of 143% with polybutene lubricant compared to the control.

Furthermore, the delubricated disks showed that the polybutene lubricant reduced the coefficient of friction, and improved toughness of the coating. Lubricant retention is defined as the amount of lubricant a disk will hold which cannot be wiped off by a specific wiper at a specific pressure for a given number or duration of wipes.

TABLE 2

|  | Control Formulation | Additive Cell |
|---|---|---|
| Polymeric Additive | none | poly(butene) |
| Unlubricated Surface Coefficient of friction | 0.66 | 0.55 |
| Unlubricated Film Toughness (shear tester) | poor | excellent |
| Lubricated Surface Coefficient of friction | 0.12 | 0.11 |
| Lubricanted Film Toughness (shear tester) | excellent | excellent |
| Lubricant Retention (mg) | 12.5 | 30.4 |
| Lubricant Retention Change | — | +143% |

This table shows not only the marked increase in lubricant retention available with the present invention, as does Table 1, but also shows the significant increase in coating durability brought about by the lubricating properties of the polymeric additives, as measured by the difference in coating durability of the unlubricated disks having a polymeric additive therein and that of the unlubricated disks of the control formulation.

The observed increase in abrasion resistance of the additive formulation over the control formulation appears to result from an increase in the low temperature (−20° to −80° C.) damping behavior, as observed by DMA.

The addition of poly(butene) to a standard coating formulation was found to approximately double the intensity of the low temperature damping peak. In the literature, the presence and intensity of such damping peaks have been associated with properties such as toughness and impact resistance. It appears likely that the unexpected enhancement of this low-temperature behavior explains the enhanced toughness of the unlubricated film shown in Table 2.

We claim:

1. In a magnetic recording element having a substrate and a cured magnetic coating on said substrate, wherein said magnetic coating contains microvoids and, coated on the magnetic coating or layer containing said microvoids, a lubricant, wherein said coating being applied to the substrate in the form of a liquid comprising magnetic particles dispersed in a curable binder, said lubricant being applied to the cured surface of said magnetic coating, the improvement comprising a polymeric additive in said coating composition at a concentration from 0.5% to 5% by weight of said magnetic particles wherein said additive is thermally degradable during said curing of said magnetic coating wherein said curing occurs prior to the application of the lubricant to the surface of said magnetic coating, said polymeric additive being selected from the group consisting of Polybutene, Acrylonitrite-methyl methacrylate copolymers, Maleic anhydride-methyl methacrylate copolymers, Poly(ethylene oxide) Polyformaldehyde, Poly(γ-methylstyrene), Poly(styrene-methyl methacrylate), Poly(methyl methacrylate), Polysulfones, Poly(vinyl acetate), Low molecular weight polyethylene, and polypropylene.

2. A magnetic recording element in accordance with claim 1 in which said additive is polybutene.

3. A magnetic recording element in accordance with claim 3 in which more than one of said polymeric additives is included in said magnetic coating.

* * * * *